(12) United States Patent
Ehring

(10) Patent No.: US 12,366,528 B2
(45) Date of Patent: Jul. 22, 2025

(54) METHOD AND APPARATUS FOR DETERMINING OPTICAL DENSITY OF A SOLUTION

(71) Applicant: CYTIVA SWEDEN AB, Uppsala (SE)

(72) Inventor: Hanno Ehring, Uppsala (SE)

(73) Assignee: Cytiva Sweden AB, Uppsala (SE)

( * ) Notice: Subject to any disclaimer, the term of this patent is extended or adjusted under 35 U.S.C. 154(b) by 238 days.

(21) Appl. No.: 17/997,641

(22) PCT Filed: May 17, 2021

(86) PCT No.: PCT/EP2021/062968
§ 371 (c)(1),
(2) Date: Oct. 31, 2022

(87) PCT Pub. No.: WO2021/249725
PCT Pub. Date: Dec. 16, 2021

(65) Prior Publication Data
US 2023/0221250 A1    Jul. 13, 2023

(30) Foreign Application Priority Data
Jun. 8, 2020 (GB) ................................ 2008585

(51) Int. Cl.
*G01N 21/59* (2006.01)
*G01N 21/31* (2006.01)
(Continued)

(52) U.S. Cl.
CPC ....... *G01N 21/5907* (2013.01); *G01N 21/314* (2013.01); *G01N 21/45* (2013.01);
(Continued)

(58) Field of Classification Search
CPC .. G01N 21/5907; G01N 21/314; G01N 21/45; G01N 2021/052; G01N 2021/3148;
(Continued)

(56) References Cited

U.S. PATENT DOCUMENTS 5,214,593 A    5/1993   Magnussen et al.
5,351,686 A  * 10/1994   Steuer .................. A61M 1/361
                                              600/310
(Continued)

FOREIGN PATENT DOCUMENTS

CN    205719927 U   11/2016
CN    109238990 A    1/2019
(Continued)

OTHER PUBLICATIONS

"Principles of quantitative absorbance measurements in anisotropic crystals", Physics and Chemistry of Minerals; Libowitzky et al. vol. 23, pp. 319-327 (1996).*

(Continued)

*Primary Examiner* — Mohamed K Amara
(74) *Attorney, Agent, or Firm* — Eversheds-Sutherland (US) LLP

(57) ABSTRACT

A method and instrument for determining optical density of a solution is disclosed. A flow cell 1 having at least three light paths (4a, 4b, 4c) is provided (100), wherein each light path has a respective predetermined path length, l. Absorbance readings are taken (400), A, of the solution at the at least three light paths (4a, 4b, 4c). For each pair of light paths, a slope, αc, is calculated (500) by dividing a difference in absorbance reading, ΔA, with a difference in path length, Δl. The calculated slopes, αc, are compared (600), and a) if the calculated slopes, αc, are the same, the slope is used for determining (700) optical density of the solution, or b) if the calculated slopes, αc, are not the same, the steepest slope of the calculated slopes is used for determining (701a) optical density of the solution, or the slope of the calculated slopes being in the range of an absorbance reading of 0.01 to 2 is used for determining (701b) optical density of the solution.

15 Claims, 5 Drawing Sheets

(51) Int. Cl.
*G01N 21/45* (2006.01)
*G01N 21/05* (2006.01)

(52) U.S. Cl.
CPC .................. *G01N 2021/052* (2013.01); *G01N 2021/3148* (2013.01); *G01N 2021/451* (2013.01); *G01N 2201/0668* (2013.01); *G01N 2201/1248* (2013.01)

(58) Field of Classification Search
CPC ..... G01N 2021/451; G01N 2201/0668; G01N 2201/1248; G01N 21/31; G01N 21/534; G01N 2021/5961; G01N 2021/5969; G01N 21/0303; G01N 21/05
See application file for complete search history.

(56) References Cited

U.S. PATENT DOCUMENTS

| | | | | |
|---|---|---|---|---|
| 6,124,937 | A * | 9/2000 | Mittenzwey | G01N 21/031 356/432 |
| 6,339,472 | B1 * | 1/2002 | Hafeman | G01N 21/6452 356/436 |
| 6,342,948 | B1 * | 1/2002 | Gilby | G01N 30/74 356/440 |
| 7,271,912 | B2 * | 9/2007 | Sterling | G01N 21/314 600/316 |
| 7,847,944 | B2 | 12/2010 | Buettner et al. | |
| 9,562,858 | B2 * | 2/2017 | Sano | G01N 33/4915 |
| 10,739,249 | B1 * | 8/2020 | Gunji | G01N 21/05 |
| 2003/0160961 | A1 * | 8/2003 | Hafeman | G01N 21/253 356/433 |
| 2005/0036147 | A1 * | 2/2005 | Sterling | G01N 21/314 356/436 |
| 2005/0106749 | A1 * | 5/2005 | Braig | G01N 21/3577 422/400 |
| 2005/0250217 | A1 * | 11/2005 | Keenan | G01N 21/27 422/400 |
| 2008/0079942 | A1 * | 4/2008 | Buettner | G01N 21/274 356/436 |
| 2008/0083263 | A1 * | 4/2008 | Philipp | B01L 3/021 73/1.74 |
| 2009/0027678 | A1 | 1/2009 | Salerno et al. | |
| 2012/0127470 | A1 * | 5/2012 | Chumachenko | G01N 21/0303 356/440 |
| 2015/0238672 | A1 * | 8/2015 | Barrett | G01N 33/721 356/40 |
| 2015/0276588 | A1 * | 10/2015 | Marshall | G01N 21/05 250/343 |
| 2015/0308942 | A1 * | 10/2015 | Dasgupta | G01N 21/31 356/402 |
| 2015/0316471 | A1 * | 11/2015 | Andersen | G01N 21/314 356/39 |
| 2015/0323475 | A1 * | 11/2015 | Kullenberg | G01N 23/10 378/53 |
| 2016/0069797 | A1 * | 3/2016 | Chanda | G01N 21/39 356/437 |
| 2017/0003203 | A1 * | 1/2017 | Heintzelman, Jr. | G01N 1/14 |
| 2018/0156715 | A1 * | 6/2018 | Francis | G01N 21/05 |
| 2019/0391168 | A1 * | 12/2019 | Salerno | G01N 21/255 |
| 2020/0249146 | A1 * | 8/2020 | Gunji | G01N 21/05 |
| 2021/0096128 | A1 * | 4/2021 | Peyser | C07K 1/22 |
| 2022/0268628 | A1 * | 8/2022 | Gantier | G01J 3/42 |
| 2023/0375407 | A1 * | 11/2023 | Muller | G01N 21/3103 |
| 2023/0400405 | A1 * | 12/2023 | Muller | G01N 21/0303 |
| 2024/0110832 | A1 * | 4/2024 | Fantini | G01N 21/51 |

FOREIGN PATENT DOCUMENTS

| | | | | |
|---|---|---|---|---|
| EP | 2677303 | A1 * | 12/2013 | ......... G01N 21/0303 |
| JP | 57-156542 | A | 9/1982 | |
| JP | H0792077 | A | 4/1995 | |
| JP | H10325797 | A | 12/1998 | |
| JP | 2006234549 | A | 9/2006 | |
| JP | 2007155674 | A | 6/2007 | |

OTHER PUBLICATIONS

PCT International Search Report and Written Opinion for PCT/EP2021/062968, mailed, Jul. 21, 2021 (15 pages).
GB Search Report for GB2008585.8, mailed Nov. 20, 2020 (4 pages).
First Office Action for Japanese Patent Application No. 2022-571319, dated Oct. 28, 2024 (15 pages).
Japanese Office Action for JP Application No. 2022-571319, dated Feb. 12, 2025 (5 pages, English translation).

* cited by examiner

METHOD AND APPARATUS FOR DETERMINING OPTICAL DENSITY OF A SOLUTION

CROSS REFERENCE TO RELATED APPLICATIONS

This application claims the priority benefit of PCT/EP2021/062968, filed May 17, 2021, which claims the priority benefit to GB Application No. 2008585.8, filed Jun. 8, 2020, the entire contents of which are incorporated herein by reference.

TECHNICAL FIELD

The present document relates to a method and apparatus for determining optical density of a solution.

BACKGROUND ART

In spectrophotometry the sample substance which is to be studied is placed in a transparent container (cuvette or flow cell). Electromagnetic radiation of a known wavelength, $\lambda$, (i.e. ultraviolet, infrared, visible, etc.) and intensity is incident on one side of the cuvette. A detector, which measures the intensity of the exiting light is placed on the opposite side of the cuvette. The length that the light propagates through the sample is the distance d. For a sample substance, e.g. proteins, DNA or RNA, consisting of a single homogeneous substance with a concentration c, the light transmitted through the sample will follow a relationship known as Beer's Law: $A=\epsilon cl$, where A is the absorbance, $\epsilon$ is the absorptivity or extinction coefficient (normally at constant at a given wavelength), c is the concentration of the sample and l is the path length of light through the sample.

Such a system is a so-called fixed path-length spectrophotometry system. Dilution of the sample is often required to measure an absorbance value that falls within the linear range of the instrument. Dilution is, however, often not possible when used as detector in a chromatography or filtration system as the monitor needs to measure absorbance continuously over a long time.

One solution to the dilution problem is to reduce the path length in making the absorbance measurement. By reducing the measurement path length, the sample volume can be reduced. Reduction of the path length also decreases the measured absorption proportionally to the path length decrease. If the sample concentration falls outside the linear range of the spectrophotometer the sample still may need to be diluted or another cuvette with an even smaller path length may be required before an accurate absorbance reading can be made.

Spectrophotometers coupled to a flow cell with variable path length have become a widely used technology to determine concentrations of sample substances with a wide dynamic range, thereby reducing the need to adjust the concentration of the sample to fall within the linear range of absorbance detection of the instrument. Examples of different such systems with variable path lengths are shown in U.S. Pat. Nos. 6,747,740, 6,188,474 and U.S. Pat. No. 7,808,641. Using systems with a variable path length, the slope of the obtained absorbance curve when plotted against path length is a direct measure of the sample substance concentration. A plurality of path lengths is measured, and the slope calculated continuously such that one absorbance value per scan cycle is obtained. There is no need to know the absolute path length. Although there are many advantages with a system with a variable path length, such systems may experience problems due to the mechanical adjustment of the path length. There is further a delay between the measurements at different path lengths, which may result in a slow response time and incorrect results for narrow peaks.

As an alternative to using systems with a variable path length to extend the linear dynamic range of absorbance detectors, there are systems using fixed multi-light path flow cells, see for example U.S. Pat. No. 5,214,593, wherein the absorbance of a reference beam in a relatively short reference path is multiplied by a ratio of the absorbance of a sample beam in a relatively long sample path to the reference path absorbance in developing a relative absorbance for the sample beyond its linear dynamic range.

With such an approach the pathlength of the respective paths need to be exactly known. Further, it may be difficult to decide whether a short path length is still within the linear dynamic range of the system.

SUMMARY OF THE INVENTION

It is an object of the present disclosure to provide an improved or at least an alternative method and apparatus for determining the optical density of a solution. The invention as defined by the appended independent patent claims is thus provided. Non-limiting embodiments emerge from the dependent claims, the appended drawings and the following description.

According to a first aspect there is provided a method for determining optical density of a solution. The method comprises providing a flow cell having a solution inlet and a solution outlet, the flow cell comprising at least three light paths arranged such that a direction of flow of a solution from the solution inlet towards the solution outlet passes through each light path, wherein each light path has a respective predetermined path length, l. The solution is added to the solution inlet. The at least three light paths are irradiated and electromagnetic radiation going through the at least three light paths detected and absorbance readings, A, of the solution at the at least three light paths taken. For each pair of light paths a slope, $\alpha c$, is calculated by dividing a difference in absorbance reading, $\Delta A$, with a difference in path length, $\Delta l$. Thereafter, the calculated slopes, $\alpha c$, are compared. If a) the calculated slopes, $\alpha c$, are the same, the slope is used for determining optical density of the solution, of if b) the calculated slopes, $\alpha c$, are not the same, the steepest slope of the calculated slopes is used for determining optical density of the solution, or the slope of the calculated slopes being in the range of an absorbance reading of 0.01 to 2 is used for determining optical density of the solution.

Absorbance readings are taken at the at least three light paths using a light source arranged at a first side of the light path and a detector arranged at an opposite side of the light path. The light used may be light in the visible spectrum, near infrared spectrum or in the ultraviolet spectrum.

The at least three light paths with predetermined path lengths, l, are chosen based on the expected optical density, OD, range.

At least two of the path lengths need to be within the linear dynamic range of the absorbance readings. The linear dynamic range being the range of sample concentrations over which the absorbance readings are linear. Plotting the response of absorbance readings of different analyte concentrations against nominal concentration should give a straight line over the dynamic linear concentration range.

The Beer-Lambert law is expressed as $A=\alpha l c$, where $A$ is the measured absorbance, $\alpha$ is the molar absorption coefficient, $l$ is the pathlength, and $c$ is the sample concentration. This equation can then be rearranged for use with slope spectroscopy: $A/l=\alpha c$.

If the calculated slopes are the same, the slope, $\alpha c$, is used for determining optical density of the solution. In this case all path lengths are considered to be within the linear dynamic range of the absorbance readings. This shows that all path lengths are within the acceptance range (defined as absorbance range between limit of detection (LOD) and linear dynamic range (usually a linearity limit of 2 AU).

If the calculated slopes are not the same, the steepest slope of the calculated slopes may be used for determining optical density of the solution. The steepest slope is the most correct slope. For very low concentrations, the lowest value is then close to the LOD, thus resulting in a shallower slope. If the calculated slopes are not the same, the slope of the calculated slopes being in the range of an absorbance reading of 0.01 to 2 may alternatively be used for determining optical density of the solution.

If the calculated slopes are not the same, a first step would be to check which slope is steeper. Then the steepest slope may be used for determining the OD, as in the first alternative. The absolute values could be used to verify the validity of the data. Alternatively, as in the second alternative, the absolute values could be used for the determination of the OD.

To base the OD determination on the steepest slope only could give a more uncertain OD determination than using the absolute values.

Determining the optical density (OD) of a solution is here meant determining the OD of the solution and any particles suspended therein.

Once the optical density of the solution has been determined, the concentration of the solution can be determined by use of the Beer Lambert Law (defined above) where the molar absorptivity E of the substance is already known. This can be done manually or using a computer. Alternatively, the concentration of the solution can be determined by use of a dose-response curve which has previously been produced for the solution or substance suspended therein at a given wavelength e.g. 280 nm, or multiple response curves which are generated at different wavelengths can be used. In some applications it is the change in absorbance that is of interest, for example during separation of proteins in a chromatographic column, and so there is no need to determine the concentration of the substance. In that case, the molar absorptivity (E) need not be known. Using two frequencies of light also allows this change in absorbance to be more closely monitored when the absorbance reaches a threshold where switching to a second less absorbed light can give a better resolution of the rate of change of absorption, and consequently the approach of a maximum or minimum of concentration values.

With the present method there are no moving parts/repositioning issues or risk for leakage as when using flow cells with variable path length. Also, due to the simpler construction, there is less risk that stagnant zones, which are difficult to clean, are created. The flow cell used comprises a plurality of predetermined fixed pathlengths. With the present method a fast response time is obtained, and it is possible to decide which of the slopes is correct to base the optical density determinations on. If the pathlength is scanned it may take several seconds to get all values and if the concentration changes during that time the reading will be not correct. With simultaneous measurement the values can be taken with high frequency.

The flow cell may comprise at least four, at least five or at least six light paths, each light path having a respective predetermined path length, $l$.

Using more light paths will give a larger dynamic range and better data to assess which slope is within the linear dynamic range and which are outside. It may also be easier to find a range that is in the preferred range of measurement usually between 0.3 AU and 1.5 AU. This is a range that is well above limit of detection (noise level) and there is still enough light that reaches the detector (1.5 AU=3% reaches detector).

The absorbance readings, A, of the sample solution from the at least three light paths may be taken simultaneously.

The timing is directly linked to the solution flow rate, with flow rate and tube diameter. It can be calculated when a zone with a certain absorbance reaches the different light paths, and the information can then be used to increase time resolution of the measurement. This is commonly done in chromatography equipment to align results from different sensors (UV, conductivity, pH).

The absorbance readings, A, of the solution from the at least three light paths may alternatively, be taken successively.

The method may further comprise a step of calculating a delay time between absorbance readings from the different path lengths.

This extra step may be used for example when analysing solutions with fast changes in absorbance properties.

When comparing the calculated slopes, $\alpha c$, and if b) the calculated slopes, $\alpha c$, are not the same, the slope of the calculated slopes being in the range of an absorbance reading of 0.05-1.5, or 0.2-1, may be used for determining optical density of the solution.

In one embodiment the at least three light paths may be irradiated at the same wavelength.

Using the same wavelength, it is possible to determine the optical density (OD) of an unknown solution and any particles suspended therein.

In another embodiment, at least one of the at least three light paths may be irradiated at a wavelength which is different from the wavelength used to irradiate the other light path(s).

Such a method may be used for example if the optical density (OD) of a solution with known absorbance coefficient is analysed. When comparing slopes from different light paths irradiated at different wavelengths, the difference in wavelength used has to be corrected for.

Alternatively, different wavelengths may be used in the method during an optimization phase. The light paths are irradiated at different wavelengths to identify an optimal wavelength for irradiation of all light paths. If a wavelength used for irradiation of a light path results in the light path being saturated (and, hence, excluded from OD determination), this wavelength will not be used as the wavelength for irradiating the light paths.

According to a second aspect there is provided an instrument for determining optical density of a solution, the instrument comprising: a flow cell having a solution inlet and a solution outlet, the flow cell comprising at least three light paths, each light path being arranged such that a direction of flow of a solution from the solution inlet towards the solution outlet passes through each light path, each light path having a respective predetermined path length, $l$. A light source is arranged to irradiate the at least three light paths. A detector is located at an opposite side of the light paths from the light source, the detector arranged to detect electromagnetic radiation going through a light path from the light source. Data processing means is arranged for determining optical density of the solution. The data processing means is arranged to calculate the absorbance, A, of the solution at the at least three light paths, and to calculate a slope, $\alpha c$, for each pair of light paths by dividing a difference in absorbance reading, $\Delta A$, with a difference in path length, $\Delta l$, and comparing the calculated slopes, $\alpha c$, and a) if the calculated slopes, $\alpha c$, are the same, the slope is used for determining optical density of the solution, or b) if the calculated slopes, $\alpha c$, are not the same, the steepest slope of the calculated slopes is used for determining optical density of the solution, or the slope of the calculated slopes being in the range of an absorbance reading of 0.01 to 2 is used for determining optical density of the solution.

The light source may comprise several light units, one for each light path.

The light source may be a multiplexing light unit.

The multiplexing unit may be arranged for fast switching between different light paths.

The light source may be a split light source with one channel for each light path.

Such a light source may contain a beam splitter. For high quality data there may also be a reference detector. The light is split with the beamsplitter so that light source intensity variations can be cancelled out.

The detector may comprise several detector units, one for each light path.

The detector may be a multiplexing detector unit.

In such case the electromagnetic radiation detected through the light paths is not detected simultaneously, but sequentially with high speed (much higher than needed to monitor the process (below 1 s cycle time)).

DETAILED DESCRIPTION

Figure 2:
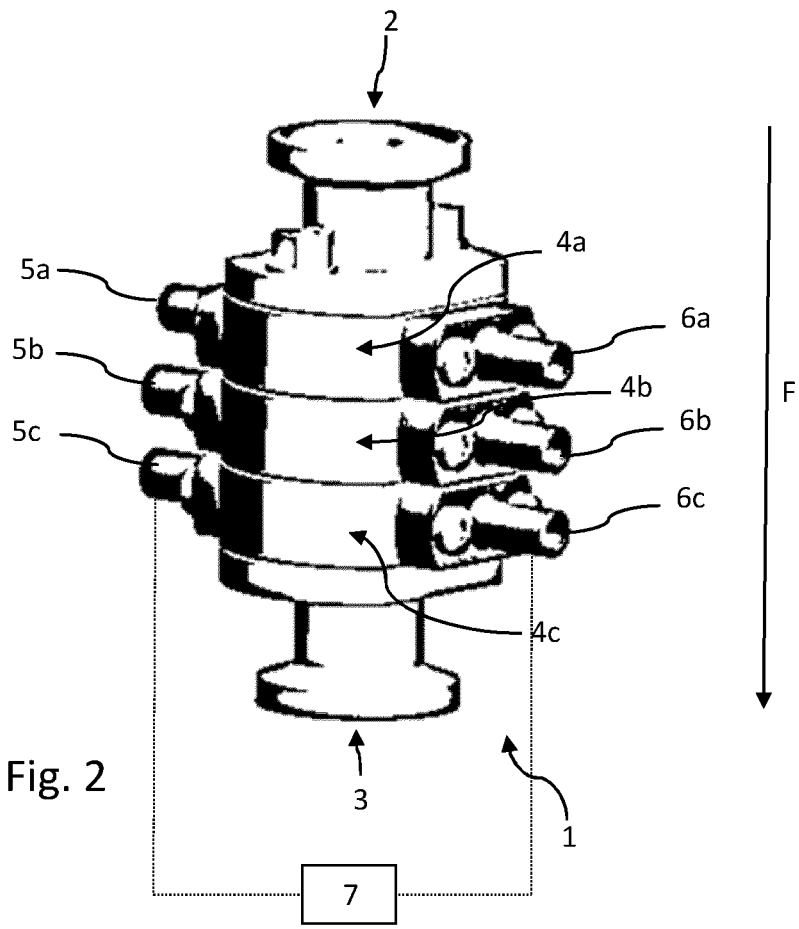
FIG. 2 shows a flow cell with multiple fixed pathlengths for use in an instrument for determining concentration of a sample in solution.
Figure 3:
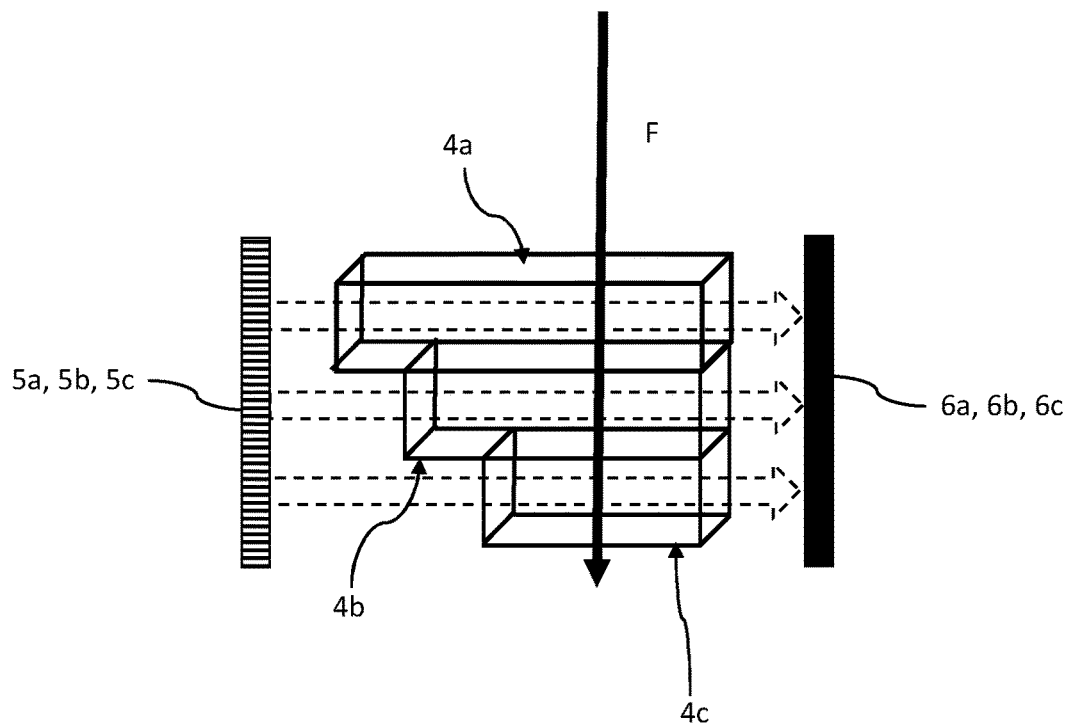
FIG. 3 shows schematically three irradiated light paths with fixed pathlength.
Figure 4:
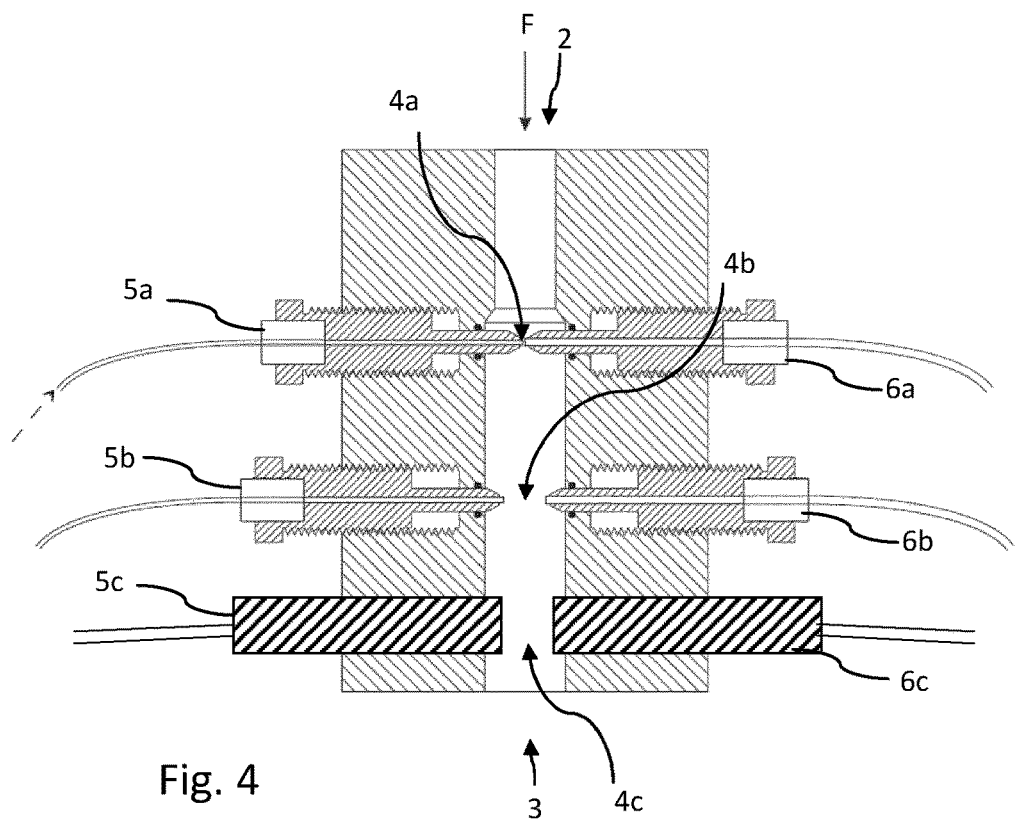
FIG. 4 shows schematically a cross section of the flow cell shown in FIG. 2.
Figure 5:
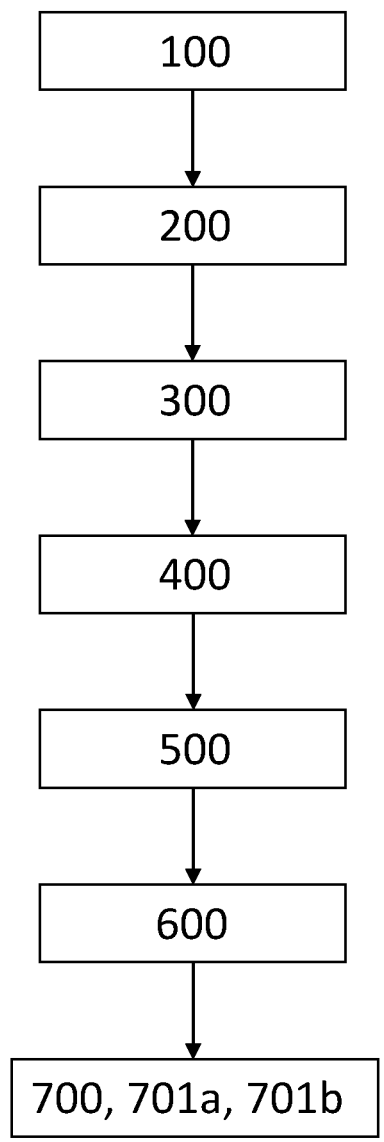
FIG. 5 schematically illustrates a method for determining the concentration of a sample in solution.
Figure 6A:
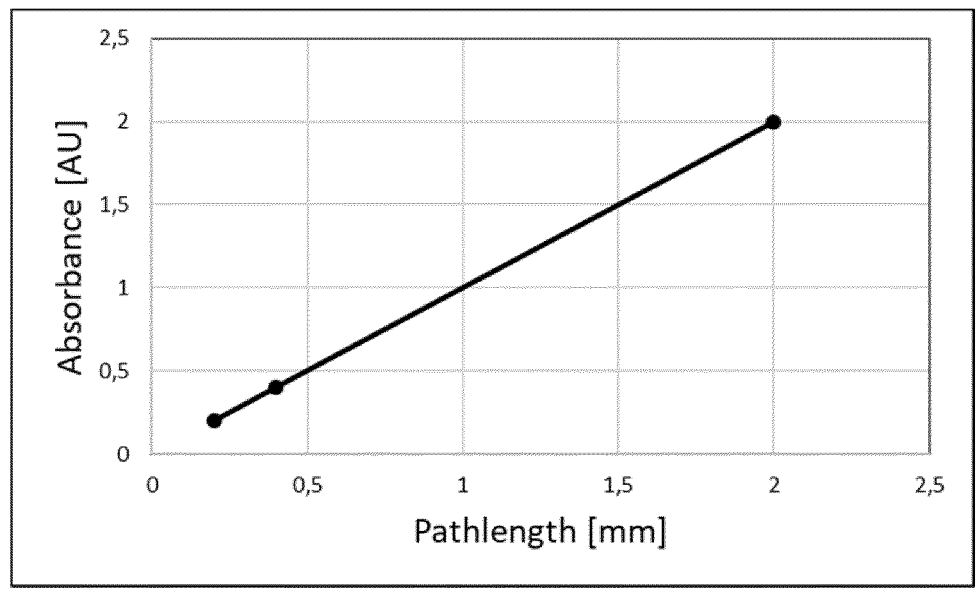
FIG. 6a shows calculated slopes, $\alpha c$, for each pair of light paths in a flow cell with three light paths. The slopes being calculated by dividing a difference in absorbance reading, $\Delta A$, with a difference in path length, $\Delta l$, for each pair of light paths. The calculated slopes being the same.
Figure 6B:
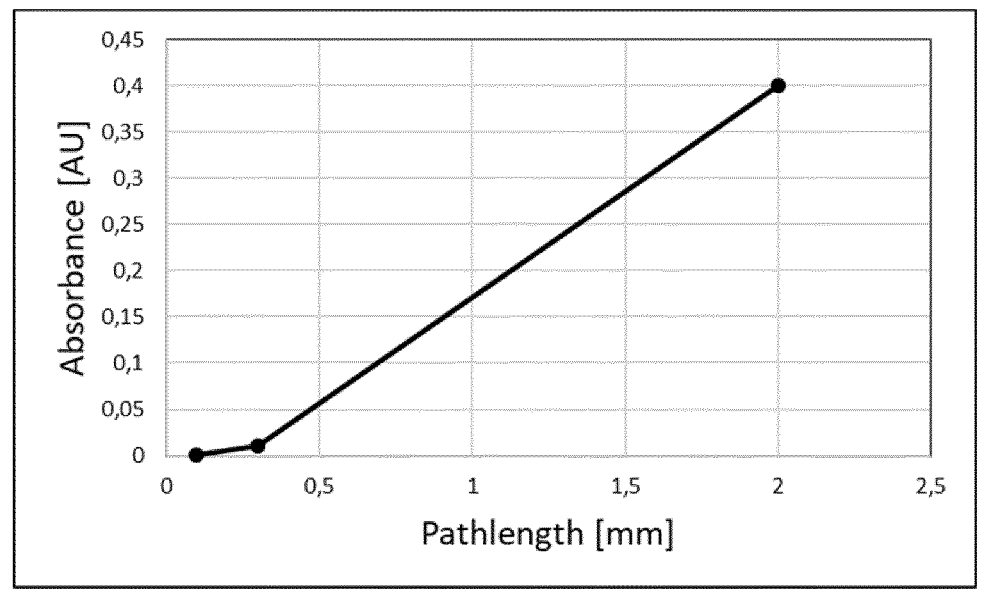
FIG. 6b shows calculated slopes, $\alpha c$, for each pair of light paths in a flow cell with three light paths. The slopes being calculated by dividing a difference in absorbance reading, $\Delta A$, with a difference in path length, $\Delta l$, for each pair of light paths. The calculated slopes being different.
Figure 6C:
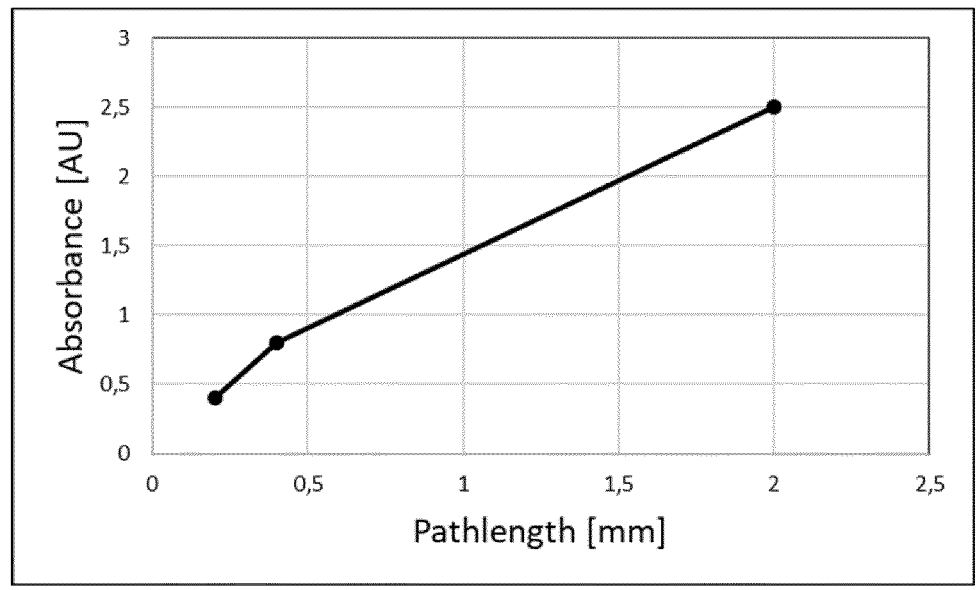
FIG. 6c shows calculated slopes, $\alpha c$, for each pair of light paths in a flow cell with three light paths. The slopes being calculated by dividing a difference in absorbance reading, $\Delta A$, with a difference in path length, $\Delta l$, for each pair of light paths. The calculated slopes being different.
Figure 6D:
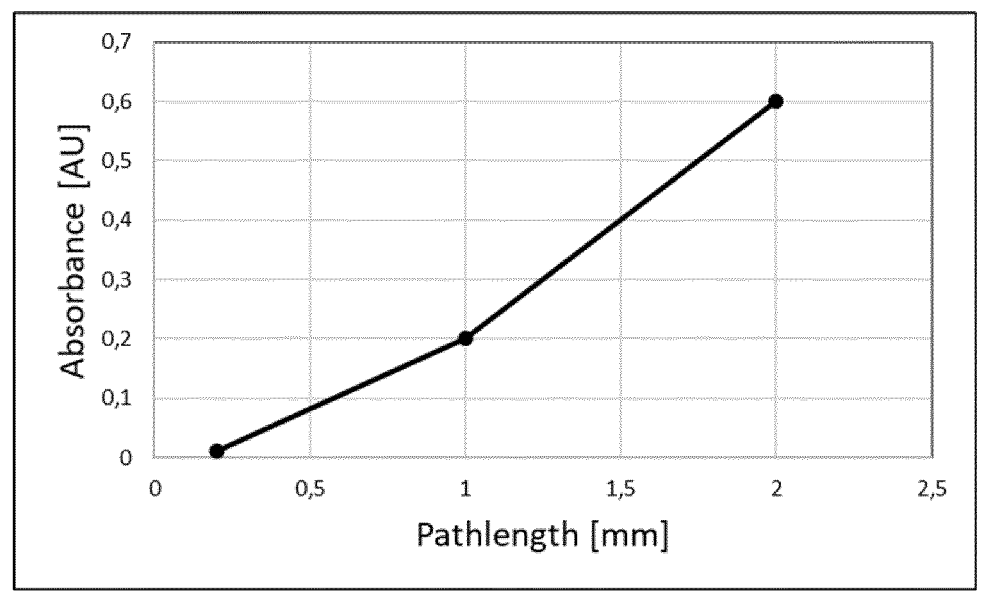
FIG. 6d shows calculated slopes, $\alpha c$, for each pair of light paths in a flow cell with three light paths. The slopes being calculated by dividing a difference in absorbance reading, $\Delta A$, with a difference in path length, $\Delta l$, for each pair of light paths. The calculated slopes being different.

In FIG. 5 is schematically illustrated a method for determining optical density of a solution by means of spectrophotometry. The solution may e.g. contain proteins, DNA or RNA, consisting of a single homogeneous substance with a concentration c. Determining optical density (OD) of a solution is here meant determining the OD of the solution and any particles suspended therein. The method comprises a step of providing 100 a flow cell 1 comprising a solution inlet 2 and a solution outlet 3. In FIG. 2 is shown such a flow cell 1 with three light paths 4a, 4b, 4c (the number of light paths may be more than three, such as four, five, six or more), wherein the flow cell 1 may be used in an instrument (not illustrated) for determining the optical density of a solution or sample(s)/particle(s) in the solution. In FIG. 4 is shown a cross section of the flow cell in FIG. 2. In FIG. 3 is schematically illustrated three irradiated light paths 4a, 4b, 4c with fixed pathlength.

The light paths 4a, 4b, 4c may be constituted by separate units with a respective predetermined fixed pathlength, l, replaceable mountable in the flow cell 1. Such a unit may be e.g. be a cuvette. Alternatively, the light paths 4a, 4b, 4c may be arranged in the flow cell as illustrated in FIG. 4. The light paths/units with predetermined path lengths, l, are chosen based on the expected optical density, OD, range of the solution to be measured. At least two of the path lengths need to be within the linear dynamic range of the absorbance readings. The linear dynamic range being the range of sample concentrations over which the absorbance readings are linear. Plotting the response of absorbance readings of different analyte concentrations against nominal concentration should give a straight line over the dynamic linear concentration range.

In a second step 200, the solution is added to the solution inlet 2. The light paths 4a, 4b, 4c are arranged such that a direction of flow F of a solution added to the flow cell at the solution inlet 2 on its way towards the solution outlet 3 passes through each light path 4a, 4b, 4c. The at least three different light paths 4a, 4b, 4c may be arranged in the flow cell 1 in a direction substantially perpendicular to the direction of flow F of the solution flowing from the inlet 2 towards the outlet 3 of the flow cell 1, as illustrated in FIG. 3. Other directions of the flow F than perpendicular to the light paths are possible as long as the liquid in the optical path is not forming a stagnant zone and as long as the liquid/solution fills the entire volume of the light path 4a, 4b, 4c. For example, at least part of the flow could be parallel with the light path. If the light path is short, special measures may have to be taken to adjust the flow F of the solution by for example redirecting part of the solution past the light path. The solution/liquid should also be homogenously mixed such that the concentration of particle(s) in the solution is substantially the same in all the at least three light paths 4a, 4b, 4c, when irradiating the light paths.

As illustrated in FIGS. 3 and 4 the light paths 4a, 4b, 4c should be arranged such that light irradiating one light path does not irradiate a separate neighbouring light path, i.e. there is no "crosstalk" between the light paths. Hence, as illustrated in FIGS. 3 and 4, the light paths 4a, 4b, 4c could be arranged substantially parallel to each other or they may be arranged in any other way in relation to each other as long as there is no crosstalk between light paths. Alternatively, the light paths 4a, 4b, 4c could be arranged at an angle (e.g. 90 degrees) to each other with a minor distance between light paths in the z-direction, forming a spiral arrangement. Such an arrangement of light paths would be more compact than an arrangement with substantially parallel light paths, minimizing flow cell dead volume.

The at least three light paths 4a, 4b, 4c may be irradiated 300 at the same wavelength, simultaneously or successively, using a light source 5a, 5b, 5c arranged at a first side of the light path 4a, 4b, 4c. Alternatively, at least one of the at least three light paths 4a, 4b, 4c may be irradiated at a wavelength which is different from the wavelength used to irradiate the other light path(s).

The light used may be light in the visible spectrum, in the near infrared spectrum or in the ultraviolet spectrum. Electromagnetic radiation going through the light paths is detected by a detector 6a, 6b, 6c arranged at an opposite side of the light paths from the light source and absorbance readings, A, of the solution taken 400 at the at least three light paths.

Absorbance measures the amount of attenuation, or intensity loss, when light passes through the sample solution. OD measures the amount of attenuation per centimetre pathlength and this value is then directly related to concentration. Scattered light is most often very small compared to absorbance.

The light source 5a, 5b, 5c may comprise several light units, one for each light path 4a, 4b, 4c, as illustrated in FIG. 4. The light source 5a, 5b, 5c may be a multiplexing light unit for fast switching between different light paths. Alternatively, the light source 5a, 5b, 5c may be a split light source with one channel for each light path.

The detector 6a, 6b, 6c may comprise several detector units, one for each light path 4a, 4b, 4c, as illustrated in FIG. 4. The detector 6a, 6b, 6c may be a multiplexing detector unit.

For each pair of light paths 4a, 4b, 4c a slope, $\alpha c$, is calculated 500 by dividing a difference in absorbance reading, $\Delta A$, with a difference in path length, $\Delta l$.

Figure 1:
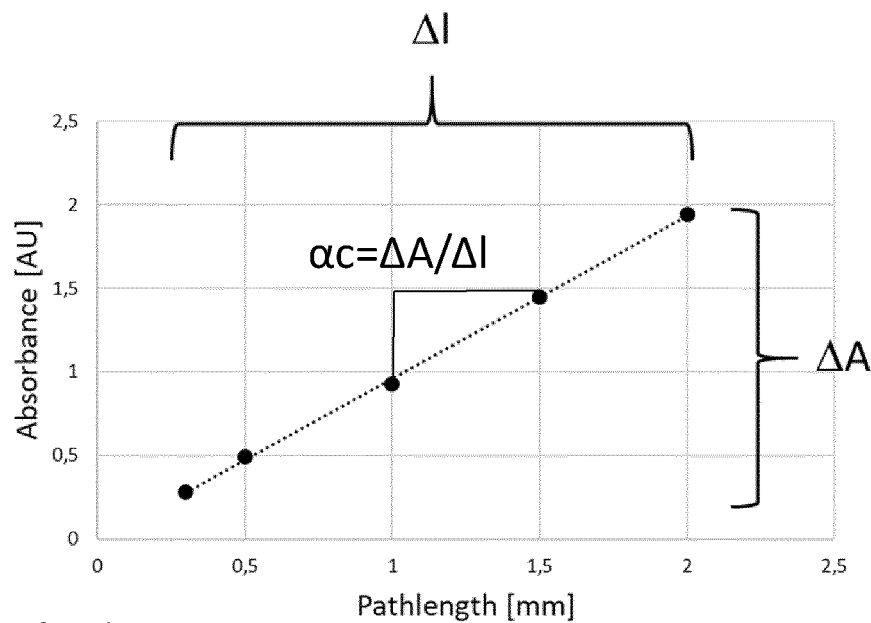
FIG. 1 shows the principle of slope spectrometry.

The principle of slope spectroscopy is illustrated in FIG. 1. The Beer-Lambert law is expressed as $A = \alpha l c$, where A is the measured absorbance, $\alpha$ is the molar absorption coefficient, l is the pathlength, and c is the sample concentration. This equation can then be rearranged for use with slope spectroscopy: $A/l = \alpha c$.

Regression coefficient analysis may be used to calculate quality data for the method. For measurements comparing slope and pathlength, a linear regression equation may be written as $A = ml + b$, where m is the slope of the regression line, and b is the y-intercept. Dimensional equality then allows for replacement of the left-hand side of the second equation above with the slope term from the third equation, yielding the following: $m = \alpha c$. That resulting equation is referred to as the slope spectroscopy equation. At very low sample concentrations noise may be limiting by giving shallower slopes.

Thereafter the calculated slopes, $\alpha c$, are compared 600. If a) the calculated slopes, $\alpha c$, are the same, see FIG. 4a, the slope is used for determining 700 the optical density (OD) of the solution/sample in solution. In this case all path lengths are considered to be within the linear dynamic range of the absorbance readings.

If b) the calculated slopes, $\alpha c$, are not the same, see FIGS. 4b-4d, the steepest slope of the calculated slopes may be used for determining 701a the OD of the solution. As an alternative, when the calculated slopes, $\alpha c$, are not the same, the slope of the calculated slopes being in the range of an absorbance reading of 0.01 to 2, or 0.05-1.0, or 0.2-1, may be used for determining 701b optical density of the solution.

If the calculated slopes are not the same, a first step would be to check which slope is steeper. Then the steepest slope may be used for determining the OD, as in the first alternative. The absolute values could be used to verify the validity of the data. Alternatively, as in the second alternative, the absolute values could be used for the determination of the OD. To base the OD determination on the steepest slope only could give a more uncertain OD determination than using the absolute values.

In FIG. 4b is shown a case wherein the shortest pathlength is below the limit of detection. In FIG. 4c is shown a case wherein the longest pathlength is saturated, while the two shorter pathlengths have an absorbance of 0.2-0.1 AU. In FIG. 4d is shown a case wherein the shortest pathlength is being saturated, while the longer pathlengths have an absorbance of 0.2-1.5. A pathlength being saturated should be excluded from OD determination.

When the flow cell comprises more than three different light paths, each light path having a respective predetermined path length, l, a slope, $\alpha c$, is calculated 500 for each pair of light paths by dividing a difference in absorbance reading, $\Delta A$, with a difference in path length, $\Delta l$. If there are e.g. five different light paths, the number of slopes calculated is four. These slopes are then compared 600 as described above and if a) the calculated slopes, $\alpha c$, are the same the slope is used for determining 700 the optical density of the solution.

If b) the calculated slopes, $\alpha c$, are not the same, see FIGS. 4b-4d, the steepest slope of the calculated slopes may be used for determining 701a the OD of the solution.

As an alternative, when the calculated slopes, $\alpha c$, are not the same, the slope of the calculated slopes being in the range of an absorbance reading of 0.01 to 2 may be used for determining 701b optical density of the solution. Using more light paths will give a larger dynamic range and better data to assess which slope is within the linear dynamic range and which are outside.

When the at least three light paths 4a, 4b, 4c are irradiated at the same wavelength it is possible to determine the OD of an unknown solution and any particles suspended therein.

When at least one of the at least three light paths 4a, 4b, 4c is irradiated at a wavelength which is different from the wavelength used to irradiate the other light path(s) OD of a solution with known absorbance coefficient may be analysed. When comparing slopes from different light paths irradiated at different wavelengths, the difference in wavelength used has to be corrected for.

Alternatively, different wavelengths may be used in the method during an optimization phase. The light paths are irradiated at different wavelengths to identify an optimal wavelength for irradiation of all light paths 4a, 4b, 4c. If a wavelength used for irradiation of a light path results in the light path being saturated (and, hence, excluded from OD determination), this wavelength will not be used as the wavelength for irradiating the light paths.

Data processing means 7 (FIG. 2) may be arranged to take the absorbance readings 400 of a solution at the at least three light paths 4a, 4b, 4c, calculate 500 a slope, $\alpha c$, for each pair of light paths 4a, 4b, 4c by dividing a difference in absorbance reading, $\Delta A$, with a difference in path length, $\Delta l$, comparing 600 the calculated slopes, $\alpha c$, and determining 700, 701a, 701b optical density of the solution (as described above).

Absorbance readings, A, of the sample solution may be taken simultaneously from the at least three light paths 4a, 4b, 4c. It is, however, not necessary to do measurements simultaneously. Absorbance measurements of the different light paths 4a, 4b, 4c can be done sequentially if the flow rate/movement of the solution between locations for different light paths is known and can be corrected for. This will improve response time.

The method may further comprise a step of calculating a delay time between absorbance readings from the different path lengths 4a, 4b, 4c. This extra step may be used for example when analysing (sample) solutions with fast changes in absorbance properties. With the knowledge of solution flow rate and tubing diameter, the transit time of a sample peak between the different locations of the different optical paths may be calculated and can be used to align the result from these optical paths.

The invention claimed is:

1. A method for determining optical density of a solution, the method comprising:
providing a flow cell having a solution inlet and a solution outlet, the flow cell comprising at least three fixed light paths arranged such that a direction of flow of a solution from the solution inlet towards the solution outlet passes through each light path,
each light path having a respective predetermined invariable path length, l, and
adding the sample solution to the sample solution inlet,
irradiating the at least three light paths,
detecting electromagnetic radiance going through the at least three light paths and taking absorbance readings, A, of the solution at the at least three light paths,
for each pair of light paths calculating a slope, $\alpha c$, by dividing a difference in absorbance reading, $\Delta A$, with a difference in path length, $\Delta l$, wherein $\Delta l$ is a difference between each respective predetermined path length, l, of the at least three fixed light paths,
comparing the calculated slopes, $\alpha c$, and
a) if the calculated slopes, $\alpha c$, are the same, using the slope for determining optical density of the solution, or
b) if the calculated slopes, $\alpha c$, are not the same, using the steepest slope of the calculated slopes for determining optical density of the solution, or if the slope of the calculated slopes is in the range of an absorbance reading of 0.01 to 2 then using that slope for determining optical density of the solution.

2. The method of claim 1, wherein the flow cell comprises at least four, at least five or at least six light paths, each light path having a respective predetermined path length, l.

3. The method of claim 1, wherein absorbance readings, A, of the solution from the at least three light paths are taken simultaneously.

4. The method of claim 1, wherein absorbance readings, A, of the solution from the at least three light paths are taken successively.

5. The method of claim 1, wherein the method further comprises a step of calculating a delay time between absorbance readings from the different path lengths.

6. The method of claim 1, wherein when comparing the calculated slopes, $\alpha c$, and b) if the calculated slopes, $\alpha c$, are not the same, the slope of the calculated slopes being in the range of an absorbance reading of 0.05-1.5, or 0.2-1, is used for determining optical density of the solution.

7. The method of claim 1, wherein the at least three light paths are irradiated at the same wavelength.

8. The method of claim 1, wherein at least one of the at least three light paths is irradiated at a wavelength which is different from the wavelength used to irradiate the other light path(s).

9. An instrument for determining optical density of a solution, the instrument comprising:
a flow cell having a solution inlet and a solution outlet, the flow cell comprising at least three fixed light paths, each light path being arranged such that a direction of flow of a solution from the solution inlet towards the solution outlet passes through each light path,
each light path having a respective predetermined invariable path length, l, and
a light source arranged to irradiate the at least three light paths,
a detector located at an opposite side of the light paths from the light source, the detector arranged to detect electromagnetic radiation going through the light paths from the light source,
a data processing means for determining optical density of the solution, wherein the data processing means is arranged to calculate the absorbance, A, of the solution at the at least three light paths, and to calculate a slope, $\alpha c$, for each pair of light paths by dividing a difference in absorbance reading, $\Delta A$, with a difference in path length, $\Delta l$, wherein $\Delta l$ is a difference between each respective predetermined path length, l, of the at least three fixed light paths, and comparing the calculated slopes, $\alpha c$, and
a) if the calculated slopes, $\alpha c$, are the same, the slope is used for determining optical density of the solution, or
b) if the calculated slopes, $\alpha c$, are not the same, the steepest slope of the calculated slopes is used for determining optical density of the solution, or the slope of the calculated slopes being in the range of an absorbance reading of 0.01 to 2 is used for determining optical density of the solution.

10. The instrument of claim 9, wherein the light source comprises several light units, one for each light path.

11. The instrument of claim 9, wherein the light source is a multiplexing light unit.

12. The instrument of claim 9, wherein the light source is a split light source with one channel for each light path.

13. The instrument of claim 9, wherein the detector comprises several detector units, one for each light path.

14. The instrument of claim 9, wherein the detector is a multiplexing detector unit.

15. The instrument of claim 9, wherein the light paths are arranged at an angle with respect to one another in a spiral arrangement.

* * * * *